US012486956B2

(12) United States Patent
Hutchins et al.

(10) Patent No.: US 12,486,956 B2
(45) Date of Patent: Dec. 2, 2025

(54) POWER AND SIGNAL TRANSFER SYSTEM AND LED DESIGN

(71) Applicant: HIL-TECH, LTD, Oakville (CA)

(72) Inventors: Julian Marc Hutchins, Oakville (CA); Nicholas David Hutchins, Oakville (CA)

(73) Assignee: HIL-TECH, LTD, Oakville, CA (US)

( * ) Notice: Subject to any disclaimer, the term of this patent is extended or adjusted under 35 U.S.C. 154(b) by 0 days.

(21) Appl. No.: 17/864,467

(22) Filed: Jul. 14, 2022

(65) Prior Publication Data

US 2024/0019090 A1 Jan. 18, 2024

(51) Int. Cl.

| | |
|---|---|
| ***F21S 4/20*** | (2016.01) |
| ***F21S 4/28*** | (2016.01) |
| ***F21V 15/00*** | (2015.01) |
| ***F21V 15/01*** | (2006.01) |
| ***F21V 23/02*** | (2006.01) |
| ***F21V 31/04*** | (2006.01) |
| ***F21Y 115/10*** | (2016.01) |
| ***H02J 50/10*** | (2016.01) |
| ***H05B 45/50*** | (2022.01) |
| ***H05B 47/20*** | (2020.01) |
| *F21W 111/02* | (2006.01) |
| *F21W 111/06* | (2006.01) |

(52) U.S. Cl.

CPC . *F21S 4/20* (2016.01); *F21S 4/28* (2016.01); *F21V 15/01* (2013.01); *F21V 23/02* (2013.01); *F21V 31/04* (2013.01); *H02J 50/10* (2016.02); *H05B 45/50* (2020.01); *H05B 47/20* (2020.01); *F21V 15/00* (2013.01); *F21W 2111/02* (2013.01); *F21W 2111/06* (2013.01); *F21Y 2115/10* (2016.08)

(58) Field of Classification Search

CPC .... F21S 4/20; F21S 4/28; F21V 31/04; F21V 29/60; F21V 29/65

See application file for complete search history.

(56) References Cited

U.S. PATENT DOCUMENTS 2,258,731 A * 10/1941 Blumenthal ........ F21V 33/0096 415/121.3
8,487,517 B2 * 7/2013 Fang ........................ F21V 3/00 362/345

(Continued)

*Primary Examiner* — William N Harris
(74) *Attorney, Agent, or Firm* — Buchanan Ingersoll & Rooney PC

(57) ABSTRACT

Embodiments relate to a power transfer system having two or more current transformers and induction loop connectors. The two or more current transformers include a primary current transformer, a secondary current transformer, or more current transformers. Power from the primary current transformer is transferred to the secondary current transformer. Further induction loops and current transformers can be added as needed. The secondary current transformer then supplies electric current to a load, or to other current transformers to provide electric current to a load(s). An addressable shorting bypass modulates power transfer to the load(s). The load can be a light source load or LED. The light source load or LED can be encapsulated with a pocket(s) having an agent to improve service life of the load or LED. Some embodiments of the LED can be structured as a unidirectional module configured to limited or prevent bleeding of light in other directions.

7 Claims, 8 Drawing Sheets

(56) References Cited

U.S. PATENT DOCUMENTS

| | | | | |
|---|---|---|---|---|
| 9,239,160 | B1 * | 1/2016 | Wang | F21V 29/67 |
| 9,335,061 | B2 * | 5/2016 | Avedon | F04D 25/08 |
| 2005/0099810 | A1 * | 5/2005 | Tasson | F21S 43/15<br>362/249.07 |
| 2006/0139932 | A1 * | 6/2006 | Park | H05K 1/021<br>362/294 |
| 2006/0227003 | A1 * | 10/2006 | Ven | F21V 11/02<br>340/815.45 |
| 2007/0123957 | A1 * | 5/2007 | Friedman | A61N 5/0603<br>607/88 |
| 2008/0158878 | A1 * | 7/2008 | Van Laanen | F21V 29/83<br>362/235 |
| 2011/0163683 | A1 * | 7/2011 | Steele | F21V 17/14<br>315/192 |
| 2012/0062095 | A1 * | 3/2012 | Horng | F21V 29/74<br>313/46 |
| 2018/0128428 | A1 * | 5/2018 | Veldman | F21K 9/232 |

* cited by examiner

POWER AND SIGNAL TRANSFER SYSTEM AND LED DESIGN

FIELD OF THE INVENTION

Embodiments relate to a power transfer system having a primary current transformer, a secondary current transformer, and an induction loop connector connected to the two current transformers. Magnetic energy generated in the primary current transformer is transferred to the secondary current transformer via the induction loop connector so that the secondary current transformer generates electrical current for a load in connection with the secondary current transformer. The load can be but is not limited to LEDs, other lighting, switches, sensors, or signals, with or without feedback, for load applications. Embodiments of the LED can include an encapsulating structure configured to provide access to a pocket for an oxidant, inert or other gas or substance, higher or lower pressure or vacuum, etc. to improve or enhance service life or protection of the LED or load. Some embodiments of the LED can include a unidirectional LED module configured to facilitate generation of unidirectional emission of light from the LED so as to limit or prevent bleeding in other directions.

BACKGROUND OF THE INVENTION

Some situations require use a power transfer system within an environment in which electrical sparks and electrical current flow can generate a potentially hazardous situation. However, conventional power transfer systems are limited in this regard because they fail to provide a means of a failsafe way to safely and efficiently transfer electrical power from a power source to a load when operating in such environments. Another deficiency of conventional power systems is the failure to provide a means to facilitate quick and easy connection and disconnection of loads. The present invention, however, provides technical solutions to these problems.

Some LED applications require encapsulation of the LED to protect the LED and to provide desired photonic effects. These LEDs, encapsulated lights, or loads can be further embedded within a solid matrix assisting with their survival in hazardous, chemical or waterlogged environments. However, some LEDs (e.g., phosphor LEDs) tend to degrade in quality and service life when encapsulated. Conventional LED designs fail to provide a means to mitigate this degradation in quality and service life. The present invention, however, provides technical solutions to these problems.

Some LED applications require emission of light in a specific direction or require emission from the LED to exhibit a specific beam spread such that there is limited or no bleeding (e.g., limited or no light emission deviating from the desired direction or from the angle of spread). Encapsulated LED designs fail to provide a means to accomplish this photonic effect. The present invention, however, provides a technical solution to this problem.

SUMMARY OF THE INVENTION

Embodiments relate to a power transfer system having two or more current transformers and an induction loop connector. The two current transformer system includes a primary current transformer and a secondary current transformer. The primary current transformer generates power, which is then transferred via the induction loop connector to the secondary current transformer. The secondary current transformer then supplies electric current to a load. More particularly, magnetic energy generated in the primary current transformer is transferred to the secondary current transformer via the induction loop connectors so that the secondary or more current transformer(s) generates electrical current or a signal to be supplied to the load with or without feedback. Multiple secondary links may be attached to the primary link for further distribution of power. This secondary current transformer connection sequence may be repeated in certain circumstances to create additional links. The electrical loop connection has an addressable shorting bypass to modulate power transfer to one or more secondary current transformers and/or one or more loads in connection with the secondary current transformer(s). While exemplary embodiments disclosed herein discuss and illustrate the load as an LED, it is understood that other loads can be used. In addition, the power transfer system can be scaled so as to be applicable for low power systems, high power systems, or any range there-between.

Embodiments relate to a power transfer system having two or more current transformers and an induction loop connector. The two current transformers system includes a primary current transformer and a secondary current transformer. The primary current transformer generates power, which is then transferred via the induction loop connector to the secondary current transformer. The secondary current transformer then supplies electric current to a load. More particularly, magnetic energy generated in the primary current transformer is transferred to the secondary current transformer via the induction loop connectors so that the secondary or more current transformer generates electrical current or a signal to be supplied to the load. The connected induction loop provides electrical isolation from external events such as local lightning strike. This isolation/protection can prevent dangerous and damaging voltage spikes from entering the main power system, or from being transferred from the main power system to the attached loads.

The power transfer system mitigates the risk of electric spark and electric current flow via power transfer through the induction loop connector. In addition, the power transfer system provides connection link(s) between the primary current transformer and the secondary current transformer, allowing for quick and easy connection/disconnection for convenient maintenance or replacement of secondary current transformer(s) and/or load(s). The addressable shorting bypass facilitates modulation of power transfer to any one or combination of the secondary current transformer(s) and/or load(s).

The power transfer system can be used, for example, on a deck or flight deck of a vessel, wherein the primary current transformer is below the deck and the secondary current transformer (along with the LED load) is embedded within or on the surface of the deck. The LED load can be used to provide lighting, communication, signals, etc. to individuals on the deck and individuals operating aircraft. Another example can be use of the power transfer system on the landing strip or tarmac of an airport, where again the primary current transformer is below the tarmac and the secondary current transformer (along with the LED or other load) is embedded within the surface of the tarmac, which can be configured to be completely flush with the pavement. Another example can be use of the power transfer system on a roadway, where again the primary current transformer is below the road and the secondary current transformer (along with the LED or other load) is embedded flush within the surface of the road. Such examples specifically use LEDs as the load, but it is understood that other types of loads can be used. It is also understood that the power transfer system is not limited to use on ground or deck surfaces.

Some embodiments of the LED can be encapsulated to provide protection to the LED lamp, provide proper securement of the LED lamp, provide a lens for LED lamp, provide a filter for the LED lamp, etc. The encapsulated LED lamp can be secured to or embedded within a structure (e.g., a housing, a substrate, a printed circuit board, etc.), and the structure can include a pocket (e.g., a volume of space configured to contain an agent, substance, fluid, gas, vacuum, etc.). The encapsulation and the structure can be configured to grant the LED lamp access (e.g., via a hole, slot, conduit, etc.) to the pocket, thereby allowing the LED lamp to be exposed to an agent such as an oxidant agent. This configuration can improve service life of the LED. This can be particularly beneficial for phosphor LEDs and other LEDs that employ oxidation as a means to facilitate light emission. With the LED lamp being encapsulated, there is a limited supply of oxidant agent, thereby degrading quality and service life of the LED. Yet, the inventive design provides for access to the agent, oxidant or otherwise in the pocket.

Some embodiments of the LED can be structured as a unidirectional LED module, which may be further configured as surface mounted, flush mounted or even a slightly below the surface mounted, unit. For instance, the LED lamp can be secured to or embedded within a structure, wherein the structure can be configured to defilade not only the LED lamp but also emissions from the LED lamp so as to restrict emissions to a desired direction or a desired spread. With such a design, bleeding of a LED device having one or more than one unidirectional LED module is limited or nonexistent. For instance, a LED device having more than one unidirectional LED module, such as a red and green module, can be used to generate red light in one direction and green light in another direction without the red and green light bleeding onto each other or into each other's direction. Such a system can be flush mounted or slightly below the pavement surface. An exemplary use of such LED devices can be on a roadway, bridge, tunnel, wrong way onto a freeway etc. wherein vehicle operators of traffic flowing one way see green light (indicating the correct way) and vehicle operators of traffic flowing another way see red light (indicating the wrong way). Another exemplary use can be illuminating directional signs during an emergency (e.g., a fire) to direct personnel—i.e., individuals crawling on the floor of a smoke-filled building, to follow green lights but not red lights. Another exemplary use can be a tilt, pitch, or yaw sensor that detects ("sees") a certain color light based on the angle of incidence.

Embodiments can relate to a power transfer system. The system can include a primary loop component having a primary current transformer. The primary current transformer can include a primary inductor core. The system can include a primary power loop routed through or near the primary inductor core. Electric current passing through the primary power loop generates magnetic flux in the primary inductor core. The system can include a secondary loop component having a secondary current transformer. The secondary current transformer can include a secondary inductor core and a secondary power loop routed about or around or through the primary inductor core and the secondary inductor core. Induced current from the primary core passing through the secondary power loop generates magnetic flux in the secondary inductor core. The magnetic flux induced in the secondary inductor core induces a current in secondary windings of the secondary induction core. The secondary windings are configured to provide power to an attached load or LED.

Embodiments can relate to a power transfer system. The system can include a primary loop component has a primary current transformer. The primary current transformer can include a primary inductor core. The system can include a primary power loop routed through or near the primary inductor core. Electric current passing through the primary power loop generates magnetic flux in the primary inductor core. The system can include a secondary loop component having a secondary current transformer. The secondary current transformer can include a secondary inductor core and a secondary power loop routed about or around or through the secondary inductor core. Magnetic flux passing through the secondary inductor core generates electrical current in the secondary power loop. An induction loop connector connecting the primary loop component with the secondary loop component such that magnetic flux generated in the primary inductor core is transferred to the secondary inductor core. The magnetic flux induced in the secondary inductor core induces a current in secondary windings of the secondary induction core. These secondary windings provide power to an attached load or LED.

In some embodiments, the induction loop connector is connected to the primary inductor core and the secondary inductor core.

In some embodiments, the primary loop component includes a plurality of primary current transformers; and/or the secondary loop component includes a plurality of secondary current transformers.

In some embodiments, the system include a connection link. The induction loop connector is connected to the primary inductor core at a first connection and is connected to the secondary inductor core at a second connection. The connection link is configured to connect to the first connection and the second connection such that the connection link and the induction loop connector form a conduction loop between the primary loop component and the secondary loop component.

In some embodiments, the induction loop connector and/or the connection link is configured to removably attach/detach to/from the first connection and/or the second connection.

In some embodiments, the system includes a housing encasing the primary current transformer; and/or a housing encasing the secondary current transformer.

In some embodiments, the system includes a control module configured to modulate power transfer from the primary loop component to the secondary loop component.

In some embodiments, the control module includes a shorting bypass switch and/or electronic connectors for passage of signals or controls.

In some embodiments, the secondary loop component is configured to transmit electrical current and signals or controls from the secondary power loop to a load.

In some embodiments, the system includes the load is a device, or other load, or any one or combination of a lights, laser, bulb, xenon, or arc lamp load; the LED is any one or combination of a chip on board (COB) LED, a surface mounted device (SMD) LED, a dual in-line package (DIP) LED, or an organic LED.

Embodiments can relate to support structure for a LED or light source, or device load, the support structure including: a member configured to have a lamp or device formed in or on a portion of the member; a pocket formed in or on the member, the pocket configured to contain a gas, fluid, gel, differentiated pressure or vacuum; and a pathway formed in the member configured to facilitate flow of the gas, fluid, gel, or differentiated pressure or vacuum from the pocket to the portion of the member where the LED lamp will be formed in or on.

In some embodiments, the member is a structure of a LED, light source load, or device load strip.

In some embodiments, the member is a structure of a LED, light source or device load configured as a round or other shaped point source.

In some embodiments, the gas, fluid, gel, differentiated pressure includes an oxidant agent.

In some embodiments, a gas, fluid, gel, differentiated pressure, or vacuum supply is connected to the pocket.

In some embodiments, the structure includes the LED, the light source load, or device load.

In some embodiments, the LED or the light source load includes a lamp that is encapsulated; and/or the device load is encapsulated.

Some embodiments can relate to a unidirectional LED or light source load module, comprising: a defilade structure, the defilade structure including a seat having a saddle configured to receive and retain a lamp of the LED or light source load; wherein the defilade structure includes a seat first side, a seat second side, eaves, and a platform that confine direction and spread of emissions from the lamp.

In some embodiments, the unidirectional LED or light source load module includes the LED or light source load.

In some embodiments, the unidirectional LED or light source load module includes an encapsulation for the lamp.

In some embodiments, the encapsulation includes a profile that allows the encapsulation to act as a lens for emissions from the lamp.

It is understood that embodiments of the systems, devices, and methods of the present disclosure can utilize any one or combination of the aspects disclosed herein. For instance, embodiments of the power transfer system can be used to supply power to any one or combination of the embodiments of the LED devices disclosed herein. As another example, an LED device can include any one or combination of aspects of the pocket, agent, and/or unidirectional LED module disclosed herein. Any of the embodiments disclosed herein can have modules configured to be mounted flush with or slightly below the pavement surface.

Some embodiments of the system can utilize the encapsulating materials as the focusing or directing element without the use of an additional lens system. In this instance, the focusing or directing element is formed by the careful shaping of the encapsulant during the manufacturing process.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

The following description is of exemplary embodiments that are presently contemplated for carrying out the present invention. This description is not to be taken in a limiting sense but is made merely for the purpose of describing the general principles and features of various aspects of the present invention. The scope of the present invention is not limited by this description.

Figure 1:
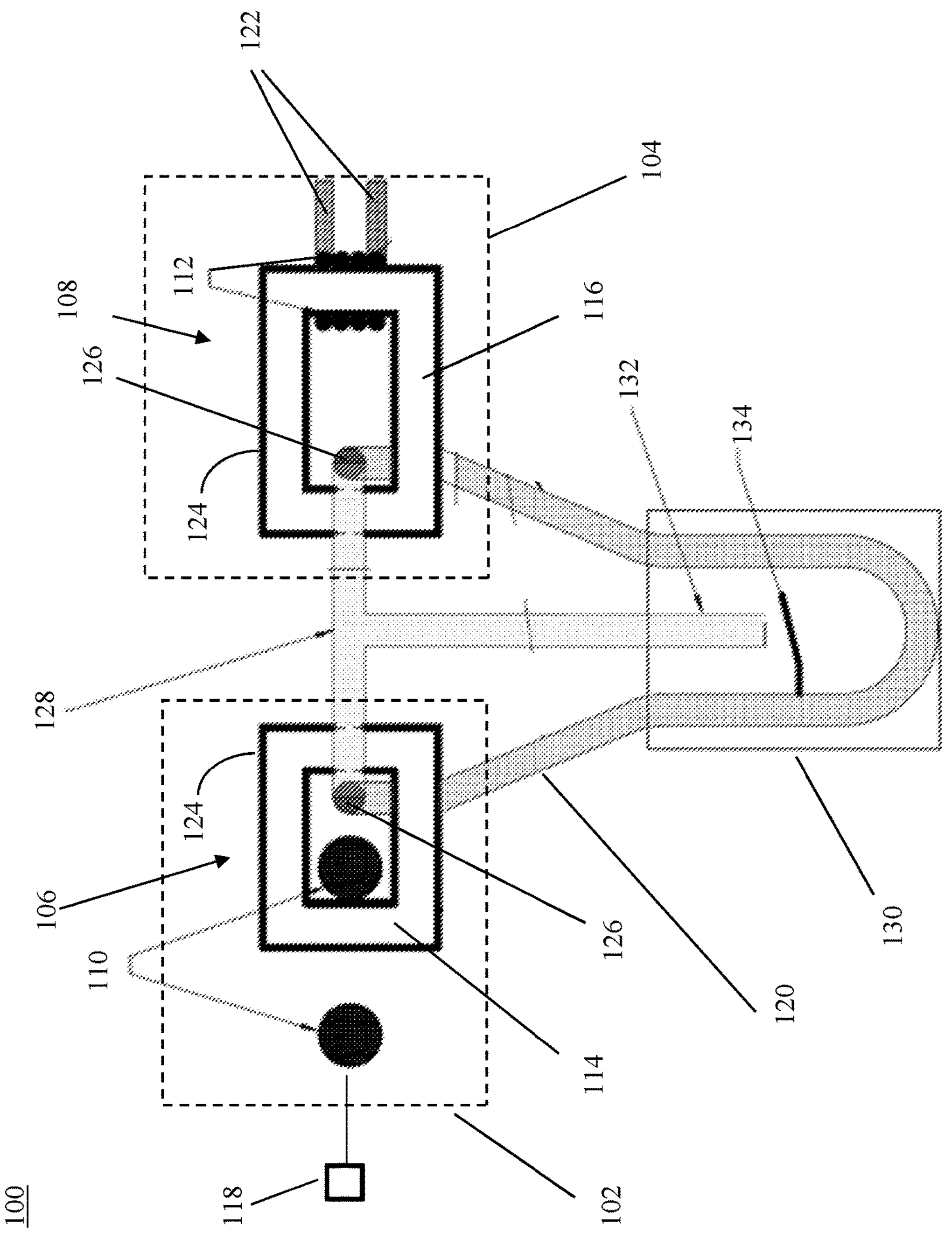
FIG. 1 shows an exemplary set up of an embodiment of the power transfer system.

Referring to FIG. 1, an exemplary set up of an embodiment of the power transfer system 100 is shown. The power transfer system 100 has a primary current transformer (PCT) 106 and a secondary current transformer (SCT) 108. While exemplary embodiments show one PCT 106 and one SCT 108, it is understood that the power transfer system 100 can have any number of PCTs 106 and SCTs 108 to meet design criteria. There can be one PCT 106 for each SCT 108, one PCT 106 for multiple SCTs 108, multiple PCTs 106 for a single SCT 108, etc. Thus, the power transfer system 100 can include a PCT loop component 102 (having one or more PCTs 106) and a SCT loop component 104 (having one or more SCTs 108).

The PCT loop component 102 includes a primary power loop 110 that is a structure (e.g., wire, cable, plate, guide, rail, sheath, etc.) comprised of any electrical conductor material (e.g., copper, aluminum, gold, silver, etc.). The primary power loop 110 a continuous loop that is routed near or through a primary magnetic inductor core 114. The primary magnetic inductor core 114 can comprise of magnetic inductor material (e.g., iron, iron alloy, steel, steel alloy, ferrite material, etc.). The primary power loop 110, when subjected to an alternating voltage difference from a voltage source 118, facilitates flow of electrical current to one or more PCTs 106 (in particular the primary magnetic inductor core 114 of each PCT 106) of the PCT loop component 102. Each PCT 106 within the PCT loop component 102, when supplied alternating electrical current, generates magnetic flux in its primary magnetic inductor core 114. The magnetic flux of each primary magnetic inductor core 114 is transferred to the SCT loop component 104 via an induction loop connector 120.

The induction loop connector 120 is a structure (e.g., wire, cable, plate, guide, rail, sheath, etc.) comprised of a magnetic inductor material (e.g., iron, iron alloy, steel, steel alloy, ferrite material, etc.). The induction loop connector 120 acts as a transformer core to transfer magnetic energy from the PCT loop component 102 to the SCT loop component 104—i.e., the magnetic flux generated in each primary magnetic inductor core 114 is transferred to the induction loop connector 120 and then further transferred to the SCT loop component 104. This can be continued with additional loops if required, each passing on the originating induction generated power to the next loop.

The SCT loop component 104 includes a secondary magnetic inductor core 116. The secondary magnetic inductor core 116 can comprise of magnetic inductor material (e.g., iron, iron alloy, steel, steel alloy, ferrite material, etc.). The induction loop connector 120 is in connection (directly or indirectly) with each primary magnetic inductor core 114 of the PCT loop component 102 and each secondary magnetic inductor core 116 (directly or indirectly) of the SCT loop component 104 so as to facilitate transfer of magnetic flux from the PCT loop component 102 to the SCT loop component 104. Each SCT 108 within the SCT loop component 104 includes a secondary power loop 112 that is a structure (e.g., wire, cable, plate, guide, rail, sheath, etc.) comprised of an electrical conductor material (e.g., copper, aluminum, gold, silver, etc.). The secondary power loop 112 is wound about the secondary magnetic inductor core 116. The magnetic flux transferred to each secondary magnetic inductor core 116 via the induction loop connector 120 generates current in the secondary power loop 112 associated therewith. Each SCT 108 includes electrical connectors to facilitate transfer of electrical current or signal from its secondary power loop 112 to one or more loads 122. For instance, any number of loads 122 can be placed into electrical connection with any number of SCTs 108 of the SCT loop component 104 to receive a reactive, electrical current, signal, from the SCT loop component 104. Additional power can be calibrated to achieve the desired power or signal level to the next component or components. Exemplary embodiments show the loads 122 being LEDs, but it is understood that any type of electrical loads 122 can be used.

Each PCT 106 can be sealed or encased within a housing 124. Each SCT 108 can be sealed or encased within a housing 124. The housing 124 can be configured to encase the PCT 106/SCT 108 so as to electrically isolate it, thermally insulate it, hermetically seal it, etc. Electrical isolate can involve preventing any electrical spark or current from exiting the PCT 106/SCT 108—i.e., any electrical current or spark (if generated by the PCT 106/SCT 108) will be confined within its respective housing 124. The housing 124 can be configured as an electrical insulator, a Faraday shield, etc. The PCT housing 124 can be for the PCT loop component 102 (e.g., one housing for all PCTs 106 within the PCT loop component 102), a housing for any one or combination of PCTs 106 (e.g., there can be a housing for each individual PCT 106, a housing for any one or combination of PCTs 106, etc.), etc. The SCT housing 124 can be for the SCT loop component 104 (e.g., one housing for all SCTs 108 within the SCT loop component 104), a housing for any one or combination of SCTs 108 (e.g., there can be a housing for each individual SCT 108, a housing for any one or combination of SCTs 108, etc.), etc.

The induction loop connector 120 is a structure that forms a loop between the PCT loop component 102 and the SCT loop component 104. There can be an induction loop connector 120 forming a loop between each PCT 106 and SCT 108 (e.g., each PCT 106—SCT 108 pair has an individual induction loop connector 120), an induction loop connector 120 between one PCT 106 and plural SCTs 108, an induction loop connector 120 between one SCT 108 and plural PCTs 106, etc.

The induction loop connector 120 can start at a PCT 106 and be routed to a SCT 108. The induction loop connector 120 can have a connector 126 at its induction loop connector PCT end and a connector 126 at its induction loop connector SCT end. These connectors 126 can be configured as quick-disconnect or quick coupling electrical connectors to facilitate connection to a connection link 128. The connection link 128 can be made of the same material and have a similar configuration as that of the induction loop connector 120. The connection link 128 can have a connection link PCT end and a connection link SCT end, each of these ends having connectors 126 that complement the connectors 126 of the induction loop connector 120. Such a configuration provides quick and convenient connection/disconnection of SCTs 108 and/or STC loop components 104 to/from the system 100. Once in place, the connection link 128, in combination with the induction loop connector 120, completes the induction loop between the PCT loop component 102 and the SCT loop component 104. The connectors 126 can facilitate easy replacement or maintenance of system 100 components or loads 122. For instance, a SCT 108 can be connected/disconnected to/from the system 100 by connecting/disconnecting the induction loop connector 120 to/from the connection link 128 at the appropriate connectors 126.

In the exemplary embodiment shown in FIG. 1, the system 100 has a PCT loop component 102 (with one PCT 106) and a SCT loop component 104 (with one SCT 108). The system 100 can be used anywhere, such as on a deck of any vessel (e.g., of an aircraft carrier) or a dock. The system including the load, can be configured so as to be completely flush with the deck (e.g., have flush mounted devices), or can be configured for use as thin surface mounted devices, etc. due to the connection system being below the deck but still completely accessible. The SCT loop component 104 can be configured to connect to LED loads 122 (e.g., its secondary power loop 112 connects to LED loads 122). The SCT loop component 104 can be embedded within or secured onto the deck of the vessel. For instance, the SCT loop component 104 can be part of or connected to a LED strip, the LED strip having plural LED lamps as the loads 122. The LED strip can be embedded within, flush mounted with or secured to the deck surface. The SCT loop component 104 can be located within the deck or just beneath the surface of the deck. The PCT loop component 102 can be configured to connect to a voltage source 118 (its primary power loop 110 connects to the voltage source 118). The PCT loop component 102 can be located beneath the deck of the vessel. The induction loop connector 120 can be housed within conduit and routed between the PCT loop component 102 and the SCT loop component 104 via the connectors 126. The connection link 128 is used to complete the induction loop by connecting to the connectors 126.

The system 100 can include a control module 130. The control module 130 can be a processor (circuitry, hardware, software, firmware, etc.) with associated memory. The processor can be a sequential processor, a parallel processor, combination of processors, etc. The memory can be transitory, non-transitory, volatile, non-volatile, etc. The control module 130 can be in connection with the induction loop connector 120 and the connection link 128. For instance, the control module 130 can be located along a portion of the induction loop connector 120, and the connection link 128 can include a line 132 extending from a portion of the connection link 128 to the control module 130. In the exemplary embodiment shown in FIG. 1, the connection link 128 is a T-shape member, in which the line 132 running from the connection link 128 forms the tail of the T. The control module 130 includes a shorting bypass switch 134. The shorting bypass switch 134 serves as an on/off switch for the system 100 (e.g., during short, the system is off). The shorting bypass switch 134 can be operated at desired frequencies to control aspects of the load(s) 122. For instance, for loads being LEDs, the operation of the shorting bypass switch 134 can be done to modulate brightness, pulse width, data flow, etc. of the LED lamps. Thus, operating the shorting bypass switch 134 via desired frequencies can provide addressable modulation for the system 100.

The load 122 can be a device, or other load, or any one or combination of a lights, laser, bulb, xenon, or arc lamp load, etc.

It is understood that any of the loads 122 configured as a light source load 122 discussed herein can be configured as point source or other type. Similarly, any of the LEDs 136 discussed herein can be configured as point source or other type. In addition, any of the light source loads 122 or LEDs 136 can be configured to emit light in any suitable light spectrum range (e.g., infrared, visible, ultraviolet, etc.). Any of the light source loads 122 can be a lamp configured as a laser, a xenon bulb arc lamp, etc. Any of the LEDs 136 can be a lamp configured as a chip on board (COB) LED, surface mounted device (SMD) LED, dual in-line package (DIP) LED, organic LED, etc.

Figure 2:
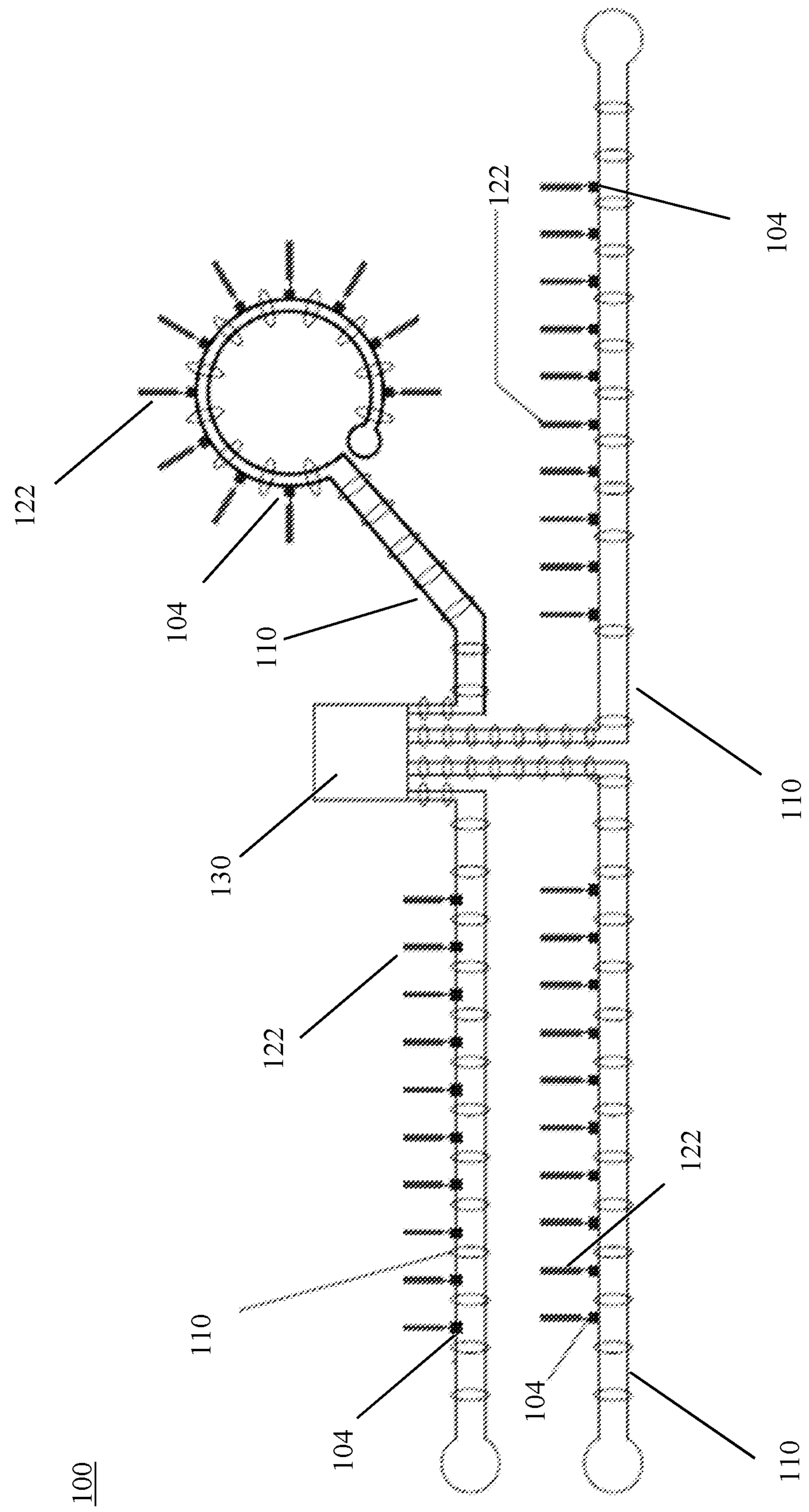
FIG. 2 shows an exemplary set up of an embodiment of the power transfer system configured to provide power to a plurality of LED or other loads.

FIG. 2 shows an exemplary set up of an embodiment of the power transfer system 100 to provide power to a plurality of LED loads 122. This exemplary set up has four PCT loop components 102. Each SCT loop component 104 is shown to have a plurality of LEDs as the loads 122 for the system 100.

Figure 3:
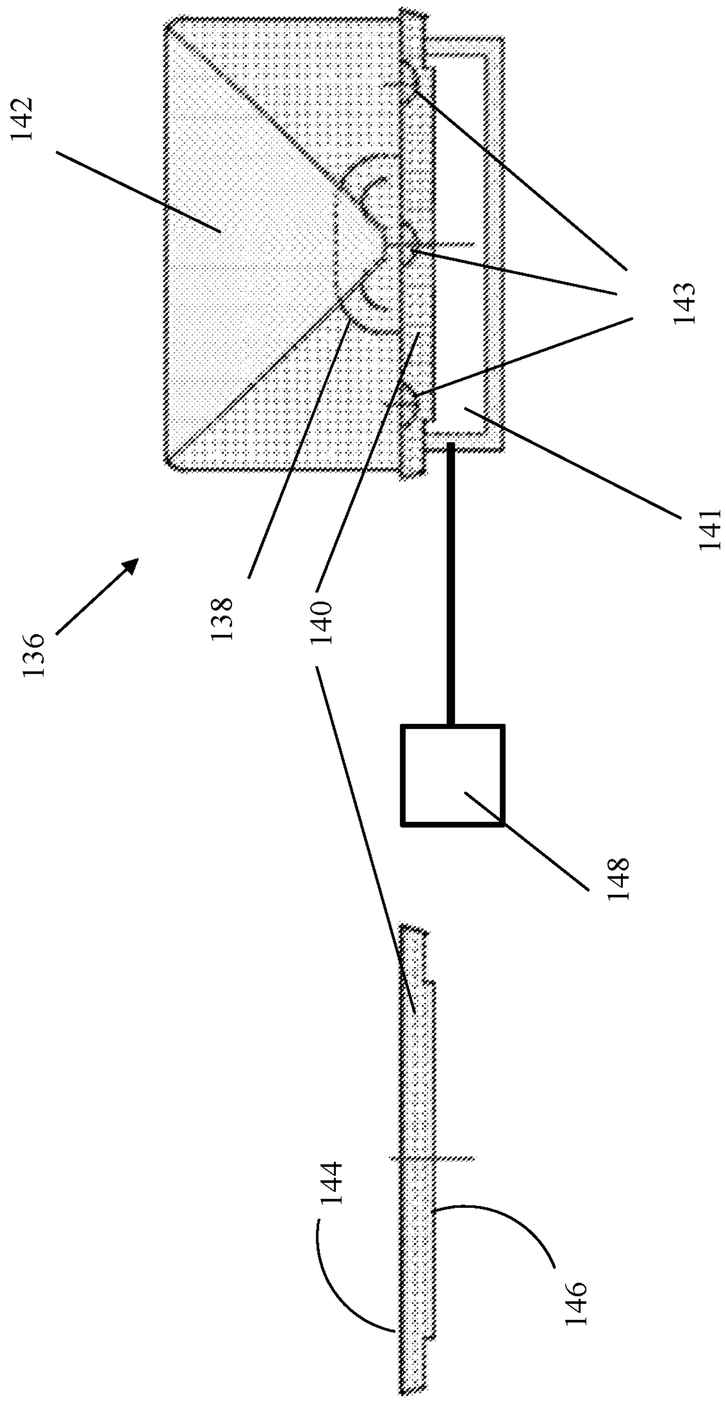
FIG. 3 shows an exemplary LED configuration having an embodiment of a pocket.
Figure 4:
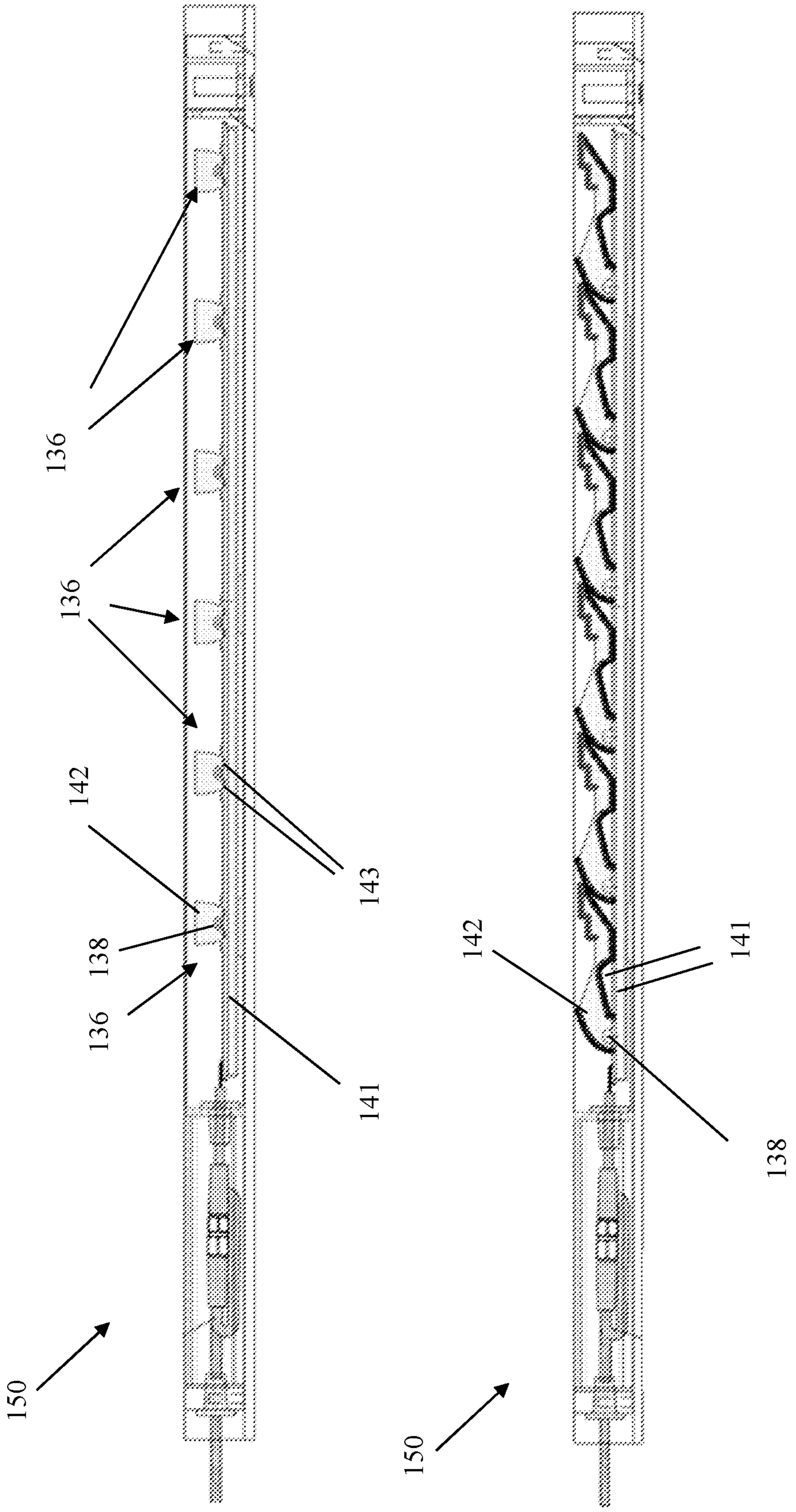
FIG. 4 shows side views of two exemplary LED strip configurations, each having an embodiment of the pocket for LED lamps.

FIGS. 3-4 show embodiments of an LED 136 having a pocket 141. Some embodiments of the LEDs 136 can be encapsulated 142 to provide protection to the LED lamp 138, provide proper securement of the LED lamp 138, provide a lens for LED lamp 138, provide a filter for the LED lamp 138, etc. The encapsulated LED lamp 138 can be secured to or embedded within a structure 140 (e.g., a housing, a substrate, a printed circuit board, etc.). The structure 140 can include a pocket 141. The pocket 141 is a volume of space configured to contain an agent, such as an oxidant, an inert gas or fluid, other gas or fluid, gas or fluid under high pressure, gas or fluid under low pressure, etc. The pocket 141 can also be under vacuum (e.g., empty space) or partial vacuum. The type of pocket 141 and whether it is a vacuum, filled or partially filled with gas/fluid, the type of gas/fluid, etc. can be determined based on criteria that will enhance or improve the protection and/or life of the load 122 or LED 136. The pocket 141 can be formed within the structure 140, adjacent the structure 140, underneath the structure 140, etc. The structure 140, and in some cases the encapsulation 142 as well, can be configured to grant the LED lamp 138 access to the pocket 141, thereby allowing the LED lamp 138 to be exposed to the agent. For instance, the structure 140, and in some cases the encapsulation 142, can have a pathway 143 (a hole, slot, conduit, etc.) that leads from the LED lamp 138 to the pocket 141. There can be any number of pathways 143 for a given LED 136. There can be any number of pockets 141 for a LED 136. Any one or combination of pockets 141 can include an agent, gas, fluid, pressure, vacuum, etc. that is the same as or different from an agent, gas, fluid, pressure, vacuum, etc. of another pocket 141.

Embodiments disclosed herein may describe and illustrate the pocket 141 as being located below the PCB 140, it is understood that the location can be elsewhere dependent on the specifics of any design.

In exemplary embodiment, the pocket 141 is configured as an oxidant pocket 141 to house or contain an oxidant agent. While the embodiments discussed herein may refer to the pocket 141 as an oxidant pocket 141 and the agent as oxidant agent, it is understood that the pocket 141 can be used to house agents other than oxidants, any type of gas or fluid, be under pressure or partial pressure, or be under vacuum, etc. These can include but are not limited to inert substances/agents/gases/fluids, etc. Accordingly, the pathways 143 can be configured for facilitating flow of the type of substances/agents/gases/fluids, etc. being used. In the exemplary embodiment of an oxidant pocket 141, the oxidant agent can be an oxidizer that is useful for the operation of the LED 136. For instance, if the LED 136 is a phosphor LED, it may be beneficial to include air or oxygen as the oxidant agent. One particular phosphor LED for which embodiments are contemplated are for blue LEDs that are used to invoke fluorescence in a phosphor material such that white light is emitted. The fluorescence relies on oxidation. With the LED lamp 138 being encapsulated 142, there is a limited supply of oxidant agent, thereby degrading quality and service life of the LED 136. Yet, the inventive design provides for access to an oxidant agent within the pocket 141. While it is contemplated for the oxidant agent to be air or oxygen, other oxidant agents can be used. Oxidant agents can also include catalysts for oxidants as well. The oxidant agent can be a gas, a liquid, a gel, etc. Whilst a white light LED example is given, this same technique may be applied to other LED colors that use a phosphor or other material to change the originating LED color or performance, or any another light type which may use material to change its color and needs an agent to change its performance, such as to prolong its life.

FIG. 3 shows an LED 136 in which the LED lamp 138 is formed in or on a structure 140 and is encapsulated 142. The structure 140 is a planar member having a structure first surface 144 and a structure second surface 146. The LED lamp 138 is formed in or on the structure first surface 144. The structure second surface 146 includes a formation extending therefrom that is the pocket 141. The structure 140 includes at least one pathway 143 extending through the structure 140 (e.g., structure first surface 144 and a structure second surface 146) so as to allow flow of oxidant (gas, fluid, other type of agent, etc.) from the pocket 141 to the LED lamp 138.

The exemplary embodiment shows the pocket 141 as a formation extending from the structure second surface 146 of the structure 140; however, it is understood that the pocket 141 can be a formation extending from the structure first surface 144, any other surface, be a cavity formation within the structure 140, etc.

In some embodiments, the pocket 141 can be coupled to a supply 148 (e.g., a reservoir of agent (gas, fluid, oxidant, other type of agent, etc.)) that supplies the pocket 141 with agent. This can be achieved via couplings and fittings attached to the pocket 141 facilitating connection to a line or hose that extends to the supply 148. The pocket 141 can be connected to the supply 148 while the LED 136 is in use. Alternatively, the pocket 141 can be provided with the couplings and fittings but not connected to the supply 148 during use—if replenishment of oxidant agent within the pocket 141 is desired, the supply 148 can be connected to the pocket 141.

In some embodiments, the pocket 141 can be coupled to a re-supply of substance/agent/gas/fluid, etc. by the inclusion of a valve system or suitable membrane which will allow substance/agent/gas/fluid, etc. to pass but will not allow unsuitable materials such as water, moisture, or other detrimental substances to enter the system.

Referring to FIG. 4, a LED device 150 can include more than one LED 136. For instance, a LED device 150 may be structured as a LED strip having plural LEDs 136. The top figure of FIG. 4 shows an exemplary LED device 150 configured as an LED strip having plural LEDs 136. With plural LEDs 136, the structure 140 can have a single pocket 141 for all LEDs 136, an individual pocket 141 for each individual LED 136, a pocket 141 for any one or combination of LEDs 136, etc. FIG. 4 shows an LED device 150 in which a plurality of LED lamps 138 is formed in or on a structure 140, wherein each LED lamp 138 is encapsulated 142. The encapsulated structure can be of any shape, but here, the structure 140 is in the form of a strip. The structure 140 can be an elongated aluminum strip configured to be secured to—for example, a deck, a roadway, etc. The structure 140 is a planar member having a structure first surface 144 and a structure second surface 146. Each LED lamp 138 is formed in or on the structure first surface 144. The structure second surface 146 includes a formation extending therefrom that is the pocket 141. For each LED lamp 138, the structure 140 includes at least one pathway 143 extending through the structure 140 (e.g., running from the structure first surface 144 to the structure second surface 146) so as to allow flow of agent from the pocket 141 to the LED lamp 138. FIG. 4 shows a single pocket 141 for each LED lamp 138 of the LED device 150; however, as explained above, other configurations can be used.

As noted above, the structure 140 can include more than one pocket 141 for any one or combination of LED lamps 138. The bottom figure of FIG. 4 shows an exemplary LED device 150 configured as an LED strip that has a configuration that is similar to the top figure of FIG. 4. With the bottom figure of FIG. 4, however, the structure 140 includes additional pockets 141. The additional pockets 141 shown in this figure are on the structure first surface 144. The structure second surface 146 includes a formation extending therefrom that of a single pocket 141 for all the LED lamps 138, and the structure first surface 144 includes formations extending therefrom, each formation being a single pocket 141 for an individual LED lamp 138. The formation on the structure first surface 144 can be a dome-like structure. The pathway(s) 143 for each LED lamp 138 can extend through the structure 140 to allow flow of-agent from the single pocket 141 formed on the structure second surface 146 to an LED lamp 138 and flow of an agent from the individual pocket 141 to that LED lamp 138.

Figure 5:
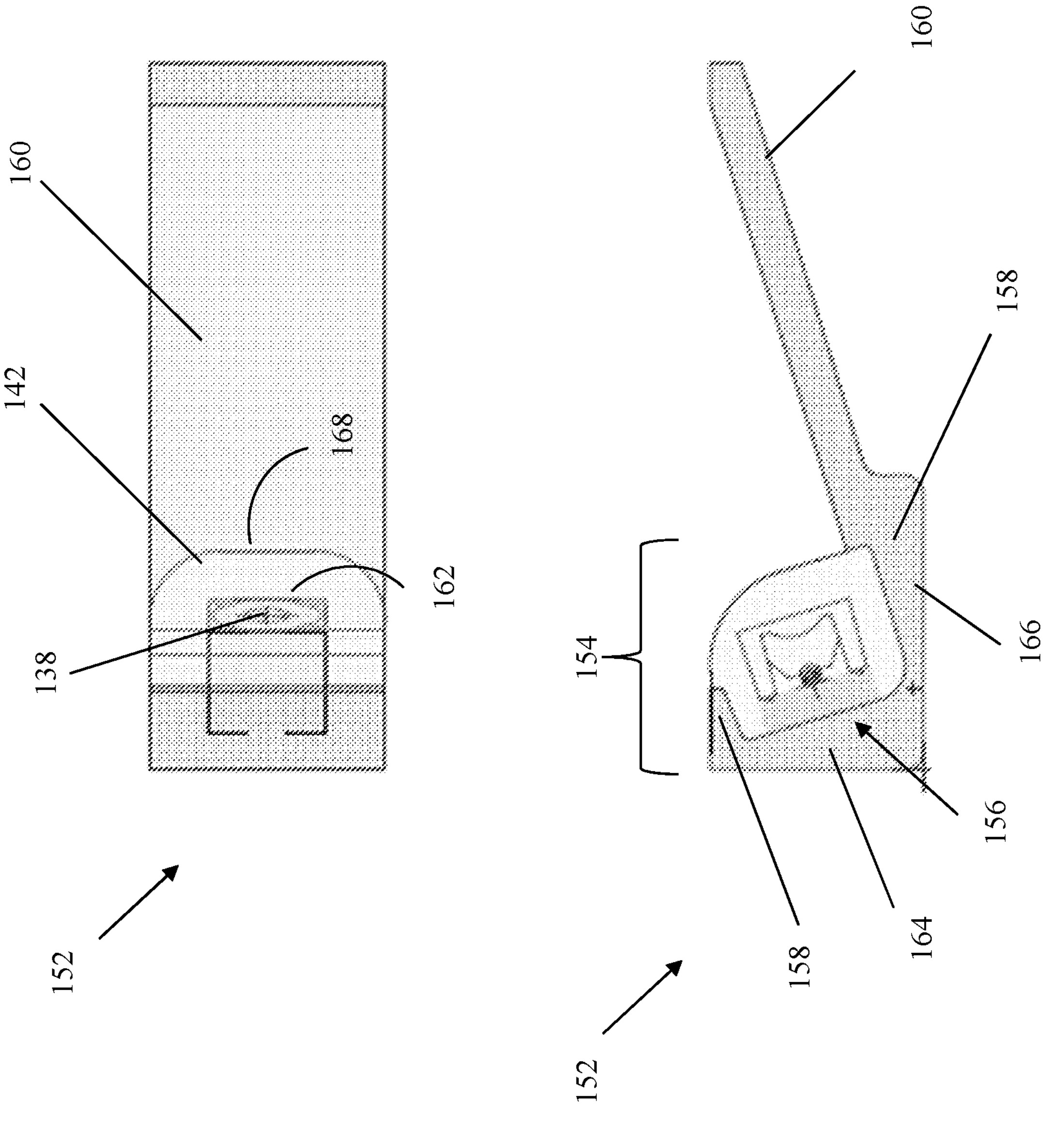
FIG. 5 shows a top view and a side view of an exemplary unidirectional LED module.

Referring to FIG. 5, some embodiments of the LED 136 can be structured as a unidirectional LED module 152. For instance, the LED lamp 138 can be secured to or embedded within a defilade structure 140. The defilade structure 140 can be configured to defilade not only the LED lamp 138 but also emissions from the LED lamp 138 so as to restrict emissions to a desired direction or a desired spread. FIG. 5 shows an exemplary unidirectional LED module 152 (top figure is a top view and bottom figure is a side view). The unidirectional LED module 152 has a seat 154 configured to receive and retain a LED lamp 138 in a saddle 156 portion of the seat 154. The saddle 156 has a shape that complements the shape of the LED lamp 138 and receives the LED lamp 138 such that eaves 158 of the seat 154 create a defilading structure for the LED lamp 138. The unidirectional LED module 152 has a platform 160 extending from the seat 154. Such light restrictions can be enhanced with additional supplementary designed obstructions, to further enhance the directionality of the desired light emission. From a side view, the unidirectional LED module 152 is shown to have a check-mark shape, but it can have an L-shape, a hook shape, a chevron shape, etc. The seat 154 can be configured to hold the LED lamp 138 at a desired angle relative to the platform 160. For instance, the seat 154 can hold the LED lamp 138 such that a front face 162 of the LED lamp 138 makes a desired angle (a) relative to the platform 160.

Figure 6A:
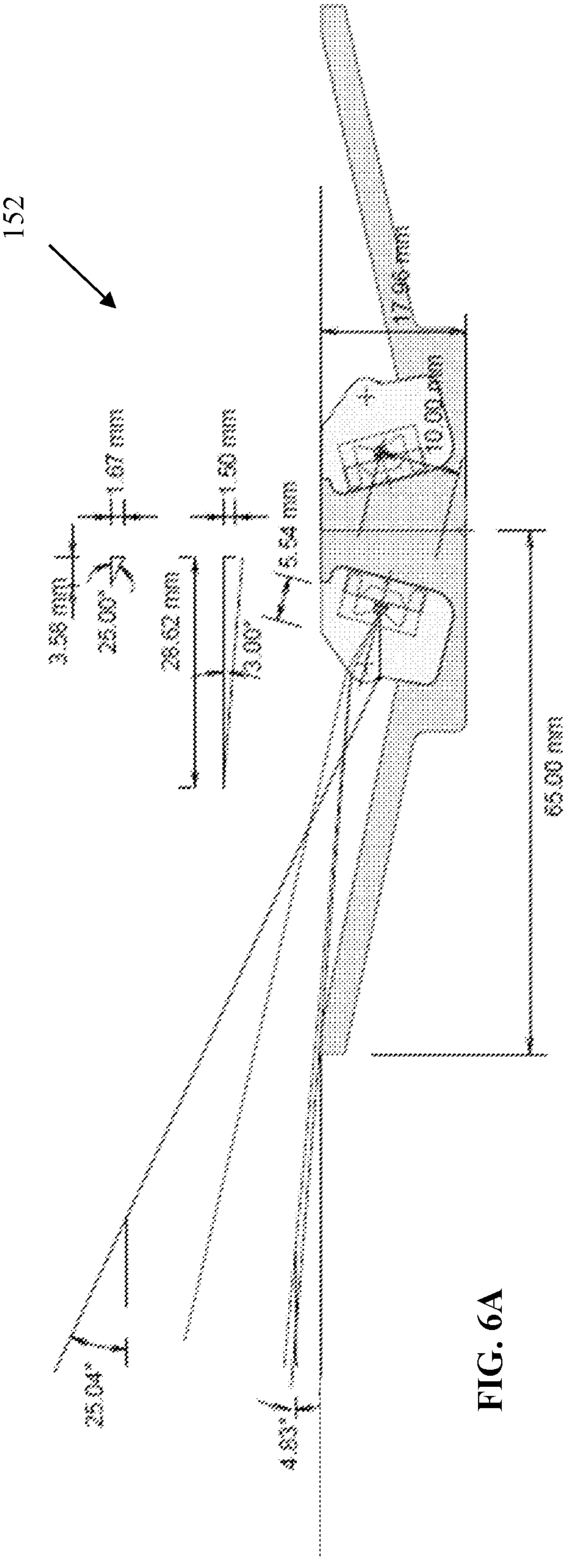
FIG. 6A shows a side view of an exemplary multi-LED unidirectional LED module configuration together with a focusing encapsulant.
Figure 6B:
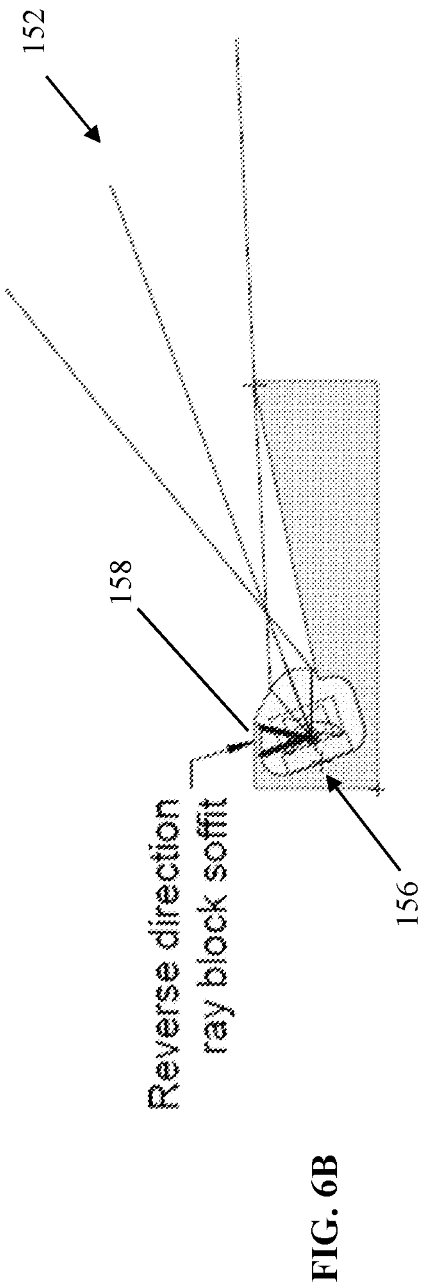
FIG. 6B shows side view of another exemplary unidirectional LED module wherein eaves provide a defilading structure.

Referring to FIGS. 6A and 6B, the seat 154 and platform 160 together provide for a defilading structure that restrict emissions from the LED lamp to a desired direction or to a desired spread. FIG. 6B shows the saddle 156 having a shape that complements the shape of the LED lamp 138 and receives the LED lamp 138 such that eaves 158 of the seat 154 create a blocking defilading structure for the LED lamp 138 emissions, so that the light may be restricted in that direction).

In the exemplary embodiment shown, the unidirectional LED module 152 has a seat 154 with a seat first side 164 making a right angle with a seat second side 166. The seat 154 has a saddle 156 located at a junction between the seat first side 164 and the seat second side 166, the saddle 156 being configured to hold the LED lamp 138 at an angle relative to the seat second side 166. The platform 160 extends from the seat second side 166. The platform 160 extends from the seat second side at an angle (β). It is contemplated for α to equal β, but it does not have to. FIG. 6 shows an embodiment with exemplary dimensions and angles. It is understood that other angles and dimensions can be used. Such shapes may hold additional structures to further extend or change the desired angularities or even block emissions in a particular direction.

As noted herein, the LED lamp 138 can be encapsulated 142. The encapsulation 142 can be a material used to cover and/or seal at least a portion of the LED lamp 138. The material used for encapsulation 142 can be clear or opaque or combination thereof, of an epoxy, polymer, resin, glass, etc. The encapsulation 142 can, not only provide protection (e.g., create a seal, provide shock absorption, etc.) for the LED lamp 138, but also be designed to generate a desired phonic effect. For instance, the encapsulation 142 can be made of a material and/or be shaped to act as a filter, a lens, etc. FIG. 6 shows the encapsulation 142 having a front surface 168 that subtends the front face 162 of the LED lamp 138. For instance, the LED lamp 138 can be secured within the saddle 156 such that its front face 162 is facing towards the seat second side 166 and/or the platform 160. The encapsulation 142 can encapsulate the LED lamp 138 and have a front surface 168 that also faces towards the seat second side 166 and/or the platform 160. The front surface 168 can have a profile such that it acts as a lens for light being emitted from the LED lamp 138. The refractive index of the material used for the encapsulation 142, the profile of the front surface 168, any optical design added to the front surface 168, the refractive index of material adjacent the encapsulation 142 (the material in the volume of space above the platform 160, and the defilade structure 140 can be used to set and maintain a desired angle of light and spread or blockage of light being emitted from the LED lamp 138. The material adjacent the encapsulation 142 will depend on the environment the LED device 150 is used for. For instance, the material can be air, water, or even a vacuum, etc.

FIG. 6 shows an exemplary multi-LED unidirectional LED module 152 configuration. In this configuration, a first unidirectional LED module 152 and a second unidirectional LED module 152 are combined (by attachment, by molding or forming a unitary piece, etc.) at their seat first sides 164. FIG. 6 shows a first LED lamp 138 facing one direction and a second LED lamp 138 having an opposite direction; however, it is understood that the LED lamps 138 of the multi-LED unidirectional LED module 152 can be facing in different directions from each other but not necessarily at opposing angles relative to each other. It is also understood that the multi-LED unidirectional LED module 152 can have any number of unidirectional LED modules 152. It is also understood that a combination of unidirectional LED modules 152 can be arranged such that its LED lamp 138 emits light that is or is not in the same geometric plane as another unidirectional LED module 152—i.e., one unidirectional LED module 152 of the multi-LED unidirectional LED module 152 may have an angle $\alpha 1$ and an angle $\beta 1$, whereas another unidirectional LED module 152 of the multi-LED unidirectional LED module 152 may have an angle $\alpha 2$ and an angle $\beta 2$. $\alpha 1$ may or may not equal $\alpha 2$; $\beta 1$ may or may not equal $\beta 2$. It is also understood that the dimensions of one unidirectional LED module 152 of the multi-LED unidirectional LED module 152 may be the same or differ from those of another one unidirectional LED module 152 of the multi-LED unidirectional LED module 152.

Figure 7A:
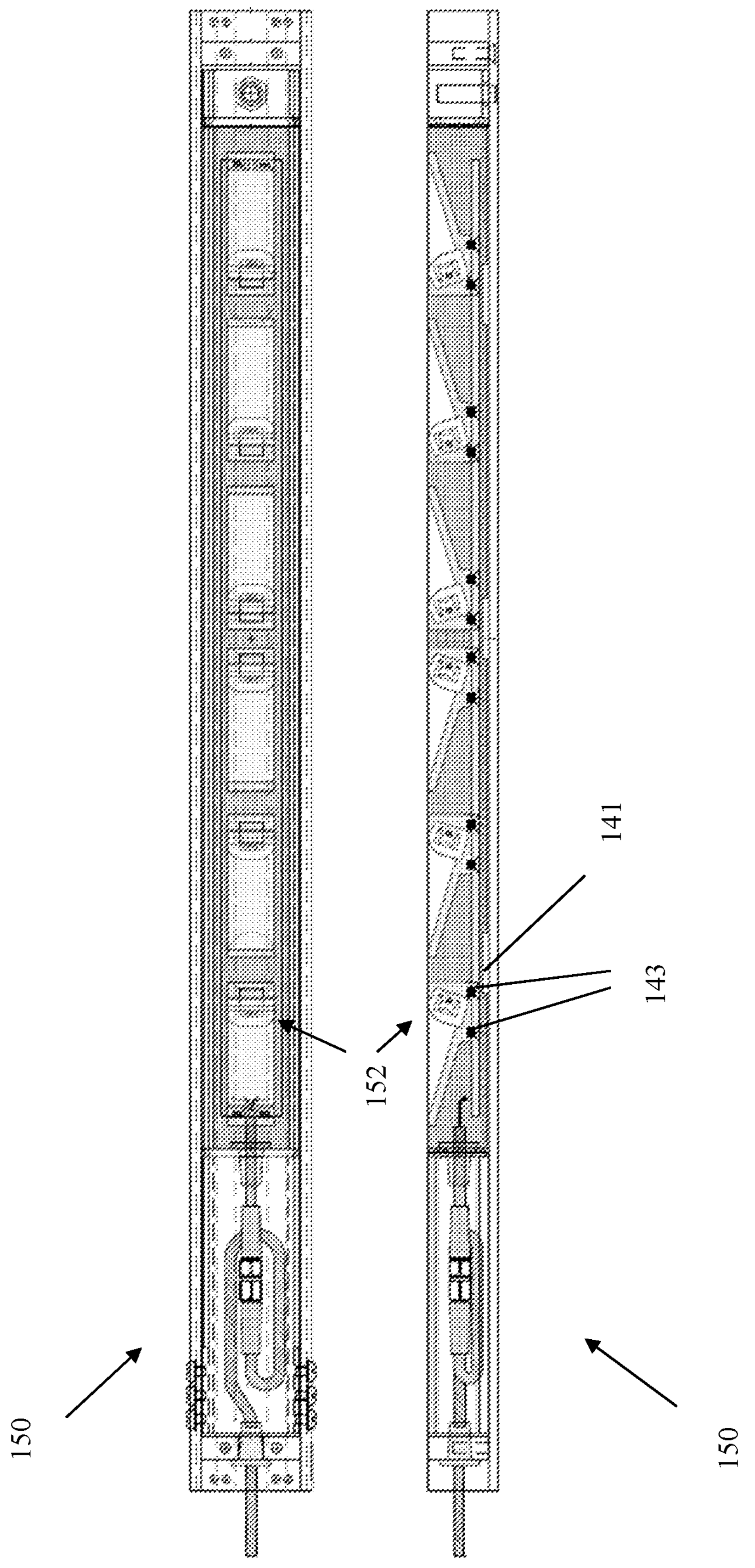
FIG. 7A shows a top view and a side view of an exemplary LED strip with a plurality of unidirectional LED modules, wherein each unidirectional LED module has an individual pocket.
Figure 7B:
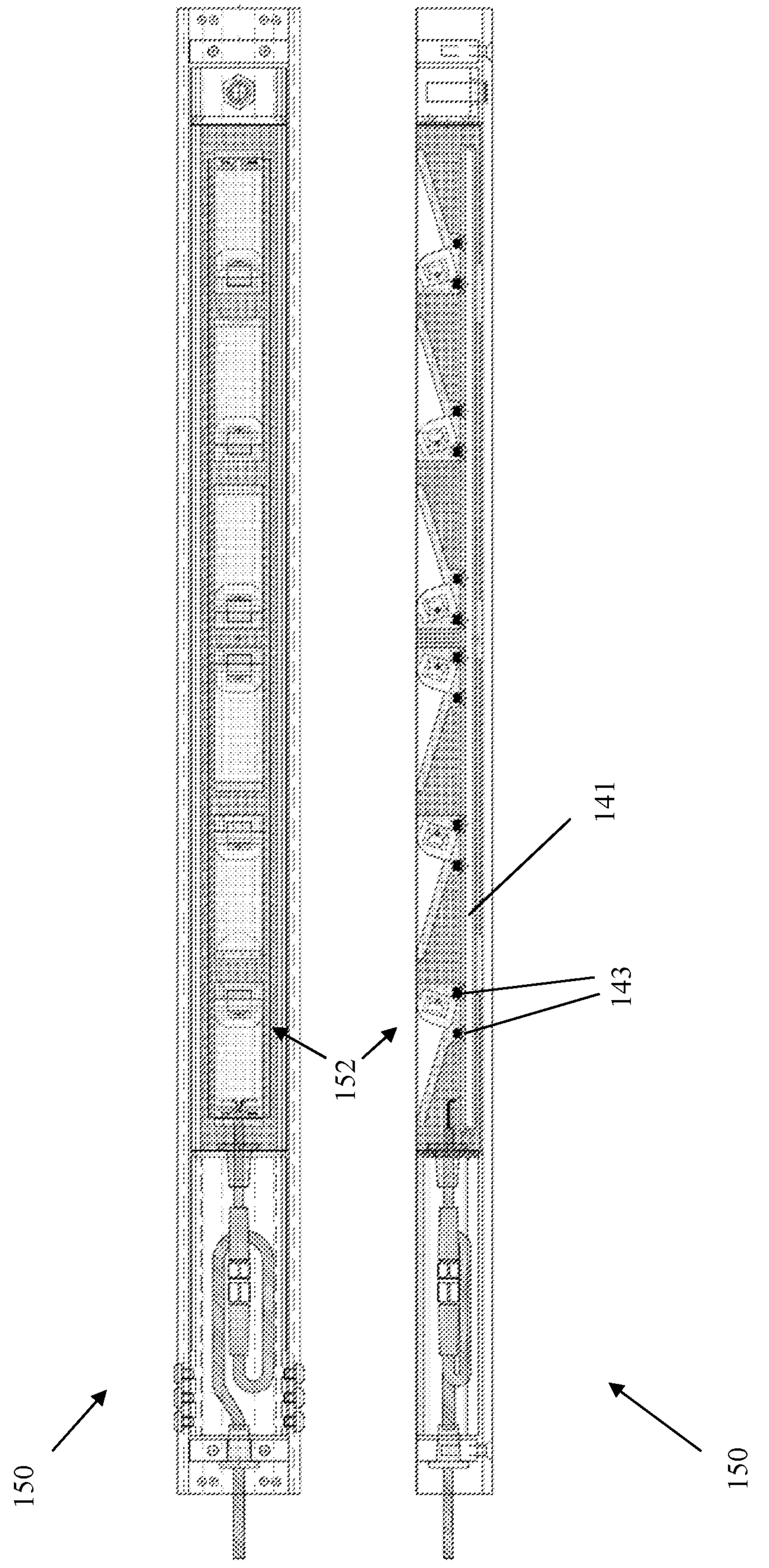
FIG. 7B shows a top view and a side view of an exemplary LED strip with a plurality of unidirectional LED modules, wherein each unidirectional LED module shares a single pocket.

Referring to FIG. 7, a LED device 150 can include more than one or type of unidirectional LED module 152. FIG. 7A shows a top view and a side view of an exemplary LED strip 150 with a plurality of unidirectional LED modules 152. In this exemplary embodiment, each unidirectional LED module 152 has an individual pocket 141. FIG. 7B shows a top view and a side view of an exemplary LED strip 150 with a plurality of unidirectional LED modules 152. In this embodiment, each unidirectional LED module 152 shares a single pocket 141. It is understood that other configurations can be used—e.g., any one or combination of unidirectional LED modules 152 can have one or more individual pockets 141, any one or combination of unidirectional LED modules 152 can share one or more individual pockets 141, etc.

The top figures of FIGS. 7A and 7B show top views of exemplary LED devices 150 configured as LED strips and the bottom figures of FIGS. 7A and 7B show side views of the same. Each of FIGS. 7A and 7B shows a LED device 150 in which a plurality of unidirectional LED modules 152 is formed in or on a structure 140 that, in this case, is in the form of a strip, it is understood however, that such structures can be formed in any desired shape. For example, the structure 140 can be an elongated aluminum strip configured to be secured to, in, or on, or flush with a deck, or a roadway, etc. In the exemplary embodiments shown, each strip has six unidirectional LED modules 152 arranged in a series. Each of a first, a second, and a third unidirectional LED module 152 is arranged to face in a first direction along the strip. Each of a fourth, a fifth, and a sixth unidirectional LED module 152 is arranged to face in a second direction along the strip. In this configuration, the first direction is opposite that of the second direction. It is understood that other configurations, directions, angles, LED patterns, etc. can be used.

As noted herein, any of the embodiments can be used in combination with other embodiments. As a non-limiting example, the LED device 150 of FIGS. 7A and 7B can include aspects of pocket(s) 141, pathway(s) 143, power transfer system(s) 100, etc. of the embodiments discussed herein.

It is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of the device and methods of making and using the same have been discussed and illustrated herein, it is to be distinctly understood that the invention is not limited thereto but may be otherwise variously embodied and practiced within the scope of the following claims.

What is claimed is:

1. A LED support structure, comprising:

a member having a first surface and a second surface;

a LED lamp formed in or on the first surface, wherein the LED lamp and the first surface form a LED-member interface;

a pocket formed in or on the second surface, the pocket configured to contain a gas, fluid, gel, differentiated pressure or vacuum; and a pathway extending from the LED-member interface through the first surface, through the member, and through the second surface to the pocket, the pathway configured to facilitate unimpeded flow of the gas, fluid, gel, or differentiated pressure or vacuum from the pocket to the LED lamp at the LED-member interface, the pathway being devoid of a flow control structure;

wherein:

the LED lamp is encapsulated with an encapsulation;

the member and the encapsulation are structured to grant the LED lamp access to the gas, fluid, gel, or differentiated pressure or vacuum only via the pathway.

2. The LED support structure of claim 1, wherein:

the member is a structure of a light source load or a device load strip.

3. The LED support structure of claim 1, wherein:

the member is a structure of a light source or a device load configured as a round, a linear, or other shaped point source.

4. The LED support structure of claim 1, wherein:

the gas, fluid, gel, or differentiated pressure includes an oxidant agent.

5. The LED support structure of claim 1, further comprising:

a gas, fluid, gel, differentiated pressure, or vacuum supply connected to the pocket.

6. The LED support structure of claim 2, further comprising:

the light source load or the device load.

7. The LED support structure of claim 1, wherein:

the LED lamp is a phosphor LED lamp;

the pocket contains gas, fluid, or gel that is an oxidant agent.

* * * * *